United States Patent [19]

Bonsack

[11] Patent Number: 5,064,632
[45] Date of Patent: Nov. 12, 1991

[54] PROCESS FOR PARTIAL OXIDATION OF FECl₂ TO FECL₃

[75] Inventor: James P. Bonsack, Aberdeen, Md.

[73] Assignee: SCM Chemicals, Inc., Baltimore, Md.

[21] Appl. No.: 554,961

[22] Filed: Jul. 17, 1990

Related U.S. Application Data

[63] Continuation of Ser. No. 207,016, Jun. 13, 1988, abandoned, which is a continuation of Ser. No. 35,778, Apr. 3, 1987, abandoned, which is a continuation-in-part of Ser. No. 832,180, Feb. 21, 1986, abandoned, which is a continuation-in-part of Ser. No. 707,197, Mar. 1, 1985, abandoned, which is a continuation-in-part of Ser. No. 638,908, Aug. 8, 1984, abandoned.

[51] Int. Cl.⁵ .................. C01G 49/06; C01G 49/10
[52] U.S. Cl. ....................................... 423/493; 423/633
[58] Field of Search ............................ 423/493, 633

[56] References Cited

U.S. PATENT DOCUMENTS

| | | | |
|---|---|---|---|
| 4,060,584 | 11/1977 | Hartmann et al. | 423/633 |
| 4,259,298 | 3/1981 | Turner et al. | 423/493 |
| 4,329,322 | 5/1982 | Bonsack et al. | 423/79 |

OTHER PUBLICATIONS

Levenspiel, *Chemical Reaction Engineering*, 2nd ed. John Wiley & Sons, 1972, pp. 397–398, 506∝509.
Chemistry, Bailar, Jr. et al., Academic Press, 1978, pp. 419–420.

*Primary Examiner*—Jeffrey E. Russel
*Attorney, Agent, or Firm*—Lieberman Rudolph & Nowak

[57] ABSTRACT

There is provided a process for the partial oxidation of solid ferrous chloride and the complete oxidation of all carbon that is present with molecular oxygen at 350° C. to 675° C., to produce ferric oxide and ferric chloride vapor without producing elemental chlorine.

10 Claims, 1 Drawing Sheet

PROCESS FOR PARTIAL OXIDATION OF FECL$_2$ TO FECL$_3$

This application is a continuation of application Ser. No. 07/207,016, filed June 13, 1988, now abandoned, which is a continuation of application Ser. No. 07/035,778, filed Apr. 3, 1987, now abandoned, which is a continuation-in-part of application Ser. No. 06/832,180, filed Feb. 21, 1986, now abandoned, which is a continuation-in-part of application Ser. No. 06/707,197, filed Mar. 1, 1985, now abandoned, which is a continuation-in-part of application Ser. No. 06/638,908, filed Aug. 8, 1984, now abandoned.

This invention relates to a process for partial oxidation of solid ferrous chloride to ferric chloride. This process has particular utility as a step in a process for making TiCl$_4$ in plural stages in one of which FeCl$_2$ is a by-product of fluidized bed chlorination of ilmenite and the second of which FeCl$_2$ is a by-product of a dilute phase process for chlorinating ilmenite using FeCl$_3$ as the chlorinating agent. Such a process utilizes substantially all the chlorine to produce TiCl$_4$ and converts the iron in the ilmenite into a readily disposable form of iron oxide.

RELATED APPLICATION

This application is a continuation-in-part of my copending application Ser. No. 832,180 filed 21 Feb. 1986, now abandoned, which was, in turn, a continuation in part of my then copending application Ser. No. 707,197 filed 1 Mar. 1985, now abandoned which was, in turn, a continuation-in-part of my then copending application Ser. No. 638,908 filed 8 Aug. 1984, now abandoned. This application is related to commonly owned application Ser. No. 638,977 filed 8 Aug. 1984 abandoned in favor of Ser. No. 707,196 filed 1 Mar. 1985 now U.S. Pat. No. 4,540,551 dated 10 Sept. 1985 in which is disclosed a two stage process for chlorinating an iron-containing titaniferous ore, such as ilmenite, with FeCl$_3$ reclamation. In that process, the present partial oxidation process has been found especially useful.

BACKGROUND OF THE INVENTION AND PRIOR ART

Conversion of the titanium values in various titaniferous ores has been accomplished heretofore mainly by chlorination of an ore/carbon mixture under fluidized bed conditions. Usually, the chlorination agent has been elemental chlorine. By-product iron chlorides from titaniferous ores containing iron pose a problem in disposal and waste valuable chlorine. Previously chlorine values in by-product iron chlorides have been recovered by full oxidation thereof with air or oxygen to Fe$_2$O$_3$ and Cl$_2$.

In the present process, advantages are obtained by partial oxidation of the iron chloride as distinct from the complete oxidation contemplated in prior efforts. Instead of a single stage chlorination to produce TiCl$_4$ as most often practiced heretofore, the present invention lends itself well to a two stage process. In the first stage, a major part of the ore to be processed is chlorinated in a conventional fluidized bed reactor yielding TiCl$_4$ and iron chloride, mainly FeCl$_2$. A second smaller portion of the ore is ground (−325 mesh) and chlorinated in an entrained flow reactor with FeCl$_3$ vapor. The process is successful because the chlorine values are readily recovered by partial oxidation of the FeCl$_2$ to FeCl$_3$ and Fe$_2$O$_3$.

There is a large amount of prior art directed to the oxidation of FeCl$_2$ or FeCl$_3$ to Cl$_2$ that attempts to solve problems inherent in this reaction.

The main problem with the full oxidation of FeCl$_2$ or FeCl$_3$ to Cl$_2$ is that at low temperatures where the thermodynamics are favorable, the reaction is slow. At higher temperatures where the reaction proceeds at a practical rate, the thermodynamics are unfavorable and the reaction is far from complete.

To overcome this problem, Dunn U.S. Pat. Nos. 3,887,694 and 3,376,112 and Bonsack U.S. Pat. Nos. 3,944,647 and 3,919,400 taught the use of catalysts to speed up the reaction at lower temperatures where the thermodynamics are more favorable. Dunn U.S. Pat. No. 3,865,920 and Bonsack U.S. Pat. No. 4,094,854 also suggest systems operating at higher temperatures where unreacted FeCl$_3$ is separated and recycled back to the oxidation zone. Dunn U.S. Pat. No. 3,865,920 also suggests the use of a very long "flue pipe" on the oxidation zone discharge that is held at a lower temperature.

Another severe problem with FeCl$_2$ or FeCl$_3$ oxidation to Cl$_2$ is the formation of hard, dense Fe$_2$O$_3$ deposits on the inner walls especially near the oxidation zone discharge. Attempts to solve this problem were the subjects of U.S. Pat. Nos. to Sawyer 2,642,339; Nelson, 3,050,365 and 3,092,456; Reeves, 3,793,444; and Mitsubishi, 4,073,874.

Nelson 3,092,456 introduces carbon in the discharge line of the oxidizer. I have found it to be essential to have carbon in the reaction zone itself. In Nelson's process the reaction is essentially complete. Moreover, Nelson is oxidizing iron chloride to chlorine in a gas-gas reaction rather than a gas-solid reaction as I use.

The following is a more detailed review of prior art in this field:

U.S. Pat. No. 2,642,339 to Sawyer teaches a process for oxidizing iron halides to produce iron oxide and chlorine comprising reacting ferric chloride with dry air in the vapor phase at a temperature of from 600 to 800° C. in a vertical reaction zone containing a bed of finely divided catalytic iron oxide under conditions that prevent substantial build up of reaction product on the inner surfaces of the reactor.

U.S. Pat. No. 2,657,976 to Rowe et al show a process for producing iron oxide and titanium tetrachloride from titaniferous iron ores. According to this process, the titanium ore containing iron is subdivided, mixed with carbon and placed in a chamber. Chlorine and moist air are introduced into the chamber to produce at an elevated temperature volatile ferric chloride substantially free from titanium tetrachloride. The amount of chlorine added is the theoretical amount required to react with the iron values but not with the titanium values. Moist air is also added. Ferric chloride is volatilized and separated from the titanium concentrate, and the ferric chloride reacted immediately with oxygen to produce ferric oxide and chlorine gas. The ferric oxide and chlorine so produced are separated and the chlorine returned to react with the titanium values in the concentrate to produce titanium tetrachloride. These reactions take place in a divided reactor.

U.S. Pat. No. 3,376,112 to Dunn et al relates to a process for flowing a molten metal salt complex of the formula XFeCl$_4$ where X is an alkali metal as a thin film over a moving bed of particulate inert material cocurrently with an oxygen containing gas and recovering chlorine as a product.

U.S. Pat. No. 3,495,936 to Jones discloses a dilute phase chlorination process for titaniferous ores. Here the ores reacted with chlorine and a carbonaceous reducing agent in a dilute phase reactor system to yield metal chloride products, chiefly titanium tetrachloride.

U.S. Pat. No. 3,683,590 to Dunn teaches a process for condensing iron chlorides from a gaseous stream in two steps, the first step being the cooling of the gases to about 675° C. to condense ferrous chloride as a liquid and leaving a gaseous ferrous residual and then in a second step of adding chlorine gas and sodium chloride salt separately wherein the remaining $FeCl_2$ is oxidized to $FeCl_3$ which with the initial $FeCl_3$ is converted to $NaFeCl_4$ and cooling that product to a temperature above 159° C. This process is useful for recovering iron chlorides from gaseous effluent to minimize air pollution.

U.S. Pat. NO. 3,865,920 To Dunn teaches that chlorine and iron oxide are produced by the oxidation of iron chlorides and mixtures thereof, produced in the chloride process for beneficiating titaniferous ores, by injecting oxygen in the gas space above the fluidized bed.

U.S. Pat. No. 3,925,057 to Fukushima et al teaches a process for recycling chlorine gas in the selective chlorination treatment of iron oxide ores containing titanium for the purpose of obtaining ores enriched with $TiO_2$. Here the chlorine gas introduced into the chlorination reaction is converted to ferric chloride by reaction with the iron oxide. The ferric chloride is reconverted to free chlorine by reaction with oxygen in an oxidation process, and the isolated chlorine returned to the chlorination step.

U.S. Pat. No. 3,926,614 to Glaeser teaches a process for the selective chlorination of the iron constituent of titaniferous ores using $FeCl_3$ as the chlorinating agent and using a solid carbonaceous reductant. The $FeCl_3$ can be produced by oxidizing the $FeCl_2$ resulting from the selective chlorination thereby providing for a recycled operation.

U.S. Pat. No. 4,046,853 to Robinson teaches the simultaneous chlorination of the iron and titanium values in an iron-containing titaniferous ores such as ilmenite. Here, the ilmenite is converted to ferrous chloride, but the resulting gaseous effluent is difficult to process to recover the titanium tetrachloride. The iron values in the effluent are partially oxidized to $Fe_2O_3$ and $FeCl_3$ thereby reducing the partial pressure of the ferrous chloride while maintaining the presence of some ferrous chloride to scavenge any chlorine emitted from the chlorination stage. The residual gaseous iron chlorides are condensed and chlorine free titanium tetrachloride may be recovered from the remaining gases.

U.S. Pat. No. 4,055,621 to Okudaira teaches a process for obtaining chlorine from iron chloride by adding iron oxide to iron chloride prepared by chlorinating iron-containing titanium ore, in an amount above 10% by weight of the resulting mixture, charging the mixture in solid phase into a fluidizing roasting furnace for oxidation, any overflow being oxidized in a second reactor. The iron oxide thus obtained is recycled to the primary reactor for controlling the reaction temperature in the furnace.

U.S. Pat. No. 4,140,746 to Turner et al relates to the recovery of chlorine values from iron chloride produced from the chlorination of titaniferous material containing iron and particularly from the carbo-chlorination of ilmenite which, for example, can be the first stage in the so-called chloride route to form titanium dioxide pigment. The iron chloride which may be ferric chloride or ferrous chloride is subjected to a combination of reduction and oxidation reactions. In the reduction reaction, ferric chloride is dechlorinated to ferrous chloride by a reducing agent suitable for producing a chloride compound for recycle to the chlorination process. In the oxidation reaction ferrous chloride is oxidized to ferric oxide and ferric chloride, ferric chloride being recycled to the reduction reaction. By this method the chlorine values are recovered from the by-product iron chloride by a route which avoids the difficult reaction between ferric chloride and oxygen to produce chlorine and ferric oxide.

U.S. Pat. No. 4,174,381 to Reeves et al teaches an improved process and an apparatus for producing chlorine and iron oxide in a multistage recirculating fluidized bed reactor wherein ferric chloride in the vapor phase is reacted with an excess of oxygen at temperatures of from 550 to 800° C. The improvement comprises utilizing a reactor that includes an initial "dense" zone and a downstream "dilute zone". In the dense zone, a fuel is burned, reactants and recirculated iron oxide particles are heated, ferric chloride is vaporized and at least 50% of the ferric chloride is converted to chlorine and iron oxide. In the downstream dilute zone, the conversion of ferric chloride is continued to greater than 95% completion.

European Patent publication 5054 discloses a process for the preparation of micaceous iron oxide which comprises reacting ferrous chloride substantially free from disruptive impurities, such as carbon, with oxygen at a temperature of 300 to 1200° C. The process can be carried out in a fluidized bed and it can form a part of a process for the recovery of chlorine values from iron chloride. U.S. Pat. No. 4,060,584 to Hartmann et al discloses a multistage process for recovering chlorine from ferrous chloride. In a partial oxidation step, ferrous chloride is oxidized to ferric chloride and ferric oxide under conditions that are intentionally set to prevent coke combustion. By carrying out this step at relatively low temperatures, Hartmann teaches that coke is definitely not oxidized.

As can be seen from the prior art above, in various methods for chlorinating titaniferous materials, e.g., ilmenite rutile, and titaniferous slags, to produce $TiCl_4$ and iron chlorides, chlorine is generally the chlorinating agent, and chlorine is recovered from iron chlorides by oxidation to $Cl_2$ and $Fe_2O_3$. In the $TiCl_4$ process where the partial oxidation reaction of the present case is especially advantageous, the charge of titaniferous material is divided into two portions, each of which is treated differently. The first is chlorinated by any conventional process using chlorine or a chlorine rich gas as the chlorinating agent to yield $FeCl_2$ or $FeCl_3$ or a mixture thereof, and $TiCl_4$. A second smaller portion is chlorinated to $TiCl_4$ and $FeCl_2$ in an entrained flow reactor with $FeCl_3$ from the partial oxidation step as described herein, where by-product $FeCl_2$ is oxidized to $FeCl_3$ and $Fe_2O_3$. In such process, all chlorine values are utilized in the production of $TiCl_4$ or a valuable chlorinating agent, $FeCl_3$, and easily disposed of $Fe_2O_3$.

The present invention provides, therefore, an improved process for producing $FeCl_3$ by partial oxidation of $FeCl_2$ to yield $Fe_2O_3$ and $FeCl_3$. Problems attendant disposal of by-products such as $FeCl_2$ or $FeCl_3$ are avoided.

BRIEF STATEMENT OF THE INVENTION

Briefly stated, the present invention is a process for the partial oxidation of ferrous chloride to ferric chloride and ferric oxide ($Fe_2O_3$, hematite) with oxygen which comprises: (a) establishing and maintaining at a temperature of 350° C. to 675° C. a reaction zone containing solid ferrous chloride and carbon; (b) flowing a molecular oxygen-containing gas into said reaction zone at a rate sufficient provide a contact time of at least one second; (c) feeding to said reaction zone ferrous chloride and carbon; in an amount sufficient to maintain an excess of ferrous chloride over the stoichiometric amount of oxygen in the reaction zone; (d) the oxygen in passing through the reaction zone being completely reacted such that, for example, one mole of oxygen reacts with four moles of $FeCl_2$ to yield 0.667 mole of $Fe_2O_3$ and 2.667 moles of $FeCl_3$ vapor, and additional oxygen reacts completely with the carbon present to form gaseous carbon oxides; (e) collecting and removing ferric oxide from the reaction zone, and (f) recovering ferric chloride vapor and carbon oxides from the reaction zone. Best results are obtained when a reactive or porous carbon is used.

BRIEF DESCRIPTION OF THE DRAWINGS

The invention may be understood by having reference to the annexed drawing wherein.

DETAILED DESCRIPTION OF THE INVENTION

Figure 2:
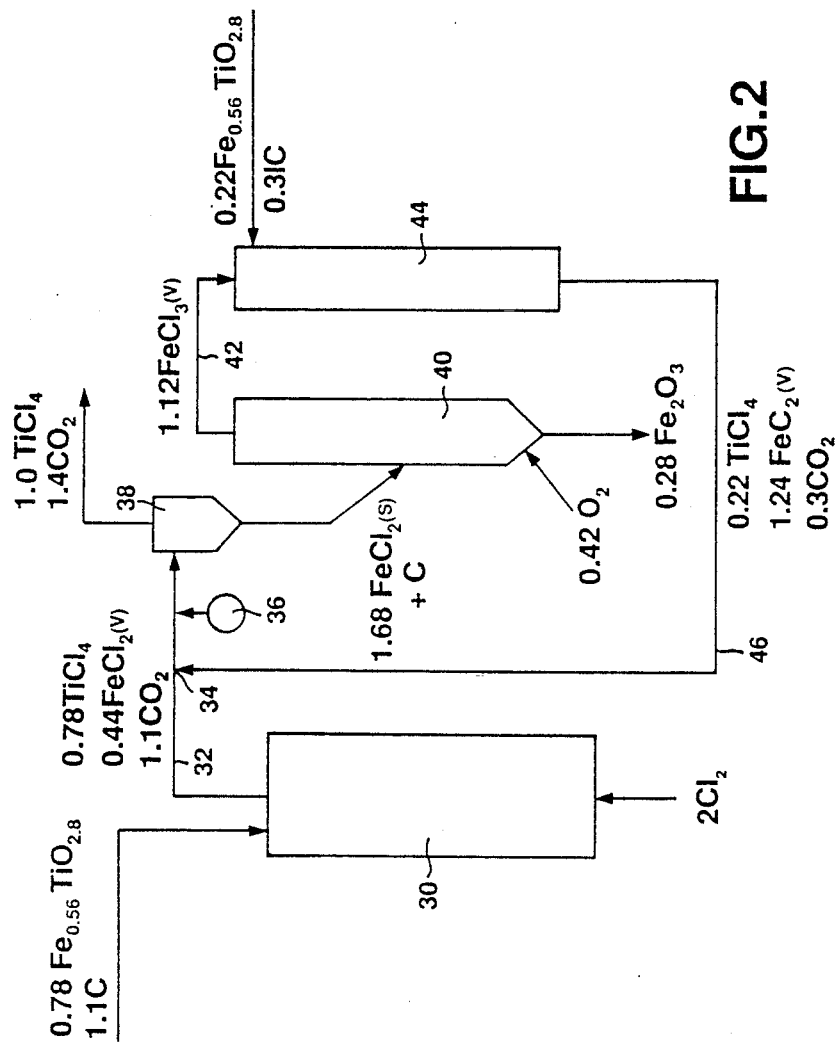
FIG. 2 is a drawing illustrating in diagrammatic form an integrated $TiCl_4$ process, which incorporates the oxidation process hereof where $FeCl_2$ is produced in both the primary and secondary chlorinators as a part thereof.

The present invention is illustrated in FIG. 2 as a part of a two stage process for producing $TiCl_4$. It is convenient, therefore, to discuss such a process wherein the present process may be used.

Although a common method in the art of making $TiCl_4$ involves chlorination of an iron-containing titaniferous material in a single reactor (fluid bed, entrained flow, or other type) with $Cl_2$ or a mixture of gases including $Cl_2$, the illustrated process is distinguished from prior efforts in that chlorination of a predetermined amount of ore is done in two stages: (a) 60-90% of the ore necessary by stoichiometry being chlorinated by a conventional process with $Cl_2$ as the sole or primary chlorinating agent; and (b) 10-40% of the ore being chlorinated in a second isolated entrained flow reactor with $FeCl_3$ vapor as the chlorination agent. The exact amounts of ore chlorinated in the primary and secondary chlorinators are dependent on the Fe/Ti ratio in the feed stock as shown in FIG. 4 in copending application Ser. No. 707,196 filed 1 Mar. 1985 entitled "Two Stage Chlorination of Titaniferous Ore with $FeCl_3$ Reclamation", now U.S. Pat. No. 4,540,551 dated 10 Sept. 1985. The $FeCl_3$ which is the chlorinating agent in the secondary chlorinator is produced by partial oxidation of $FeCl_2$ to $FeCl_3$ and $Fe_2O_3$. The iron in the iron-containing titaniferous material is recovered as readily disposable material ($Fe_2O_3$). Representative equations are:

First Stage Chlorination $$2FeTiO_3 + 6Cl_2 + 3C \rightarrow 2TiCl_4 + 3CO_2 + 2FeCl_2 \qquad (I)$$

$$2FeTiO_3 + 6Cl_2 + 6C \rightarrow 2TiCl_4 + 6CO + 2FeCl_2 \qquad (II)$$

Second Stage Chlorination $$2FeTiO_3 + 12FeCl_3 + 3C \rightarrow 2TiCl_4 + 3CO_2 + 14FeCl_2 \qquad (III)$$

$$FeTiO_3 + 6FeCl_3 + 3C \rightarrow TiCl_4 + 3CO + 7FeCl_2 \qquad (IV)$$

Ferrous Chloride Oxidation $$12FeCl_2 + 3O_2 \rightarrow 2Fe_2O_3 + 8FeCl_3 \qquad (V)$$

Figure 1:
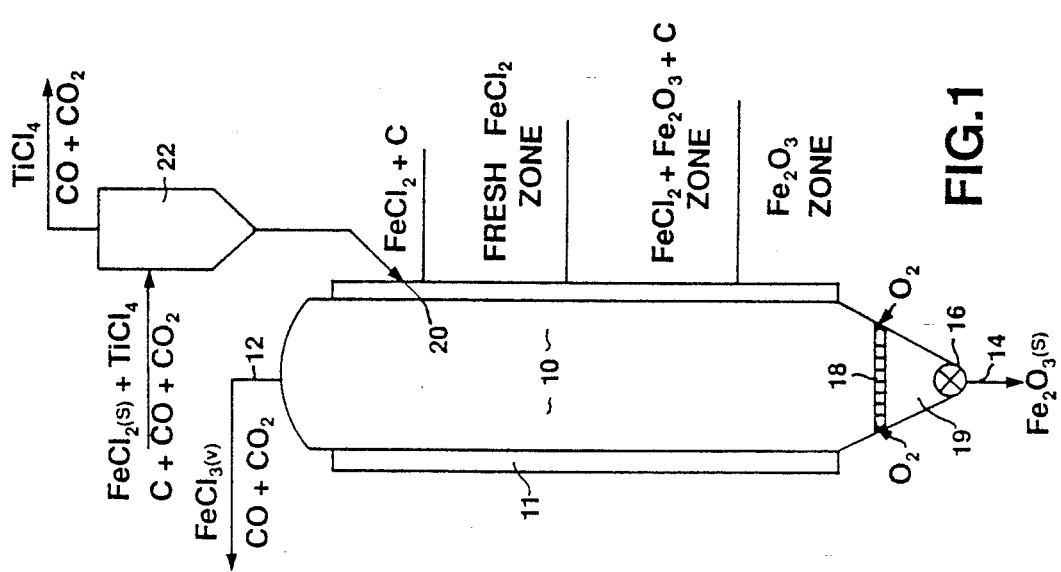
FIG. 1 shows in diagrammatic and schematic form an apparatus in which the partial oxidation reaction of the present invention may be carried out.

FIG. 1 shows in diagrammatic and schematic form a reactor in which the partial oxidation of $FeCl_2$ is carried out in the presence of carbon. Thus, there is provided a tubular reactor 10 having suitable refractory insulation 11 and a gas outlet 12 from the upper end and a solid $Fe_2O_3$ outlet 14 fitted with a suitable valve 16. Spaced upwardly from the valve 16 and near the lower end of the reactor 10 is an oxygen distribution inlet ring 18 for admitting oxygen in counter-current relation to downwardly moving $FeCl_2$. Solid $FeCl_2$ is introduced into the side of reactor 10 at an inlet port 20 near the upper end of the reactor 10 where it is allowed to fall to the upper end of the bed of solids.

In the embodiment illustrated in FIG. 1, the $FeCl_2$ and carbon are derived from a $TiCl_4$ stream containing solid $FeCl_2$ dust and carbon dust blow-over, which enters a solid-gas separator 22, e.g., a cyclone separator. The solid $FeCl_2$ and carbon enter the reactor 10 at the inlet port 20.

The interior of the reactor contains three ill-defined zones (a) an upper zone composed mainly of fresh $FeCl_2$ and carbon; (b) an intermediate zone of mixed $FeCl_2$ and $Fe_2O_3$ and carbon and (c) a lower zone composed mainly of $Fe_2O_3$ settling into the lower end 19 of the reactor 10.

In the reactor 10, it is preferable to maintain a large excess of $FeCl_2$ solids relative to the oxygen gas. The gas velocity is such that it fails to generate a fluidized bed regime for the particle diameter of the $FeCl_2$, which is generally smaller than about 100 microns as recovered from a $TiCl_4$ process. The bed of mixed gas and solid particles can be described as a loose assembly of particles which are not fluidized and which flow by gravity in response to opening valve 16. The final $Fe_2O_3$ particle is smaller than the original $FeCl_2$ particle, being for the most part less than 30 microns in diameter. Some accumulation of $Fe_2O_3$ in the lower section of the reactor 10 is beneficial to preheat the oxygen.

Desirably the temperature in the reactor is in the range of 350° C. to 675° C. and preferably from about 525° C. to 600° C.

The partial oxidation of $FeCl_2$ is desirably carried out in the presence of carbon particles. This carbon can be chlorinator blow-over dust which accompanies $FeCl_2$, or it can be separately added, or a combination of the two. In the oxygen atmosphere, the carbon burns to $CO_2$ or a mixture of $CO_2$ and CO to provide an internal source of heat in the reaction zone as illustrated below. This becomes essential in commercial scale apparatus where it is difficult to provide heat to this endothermic reaction from an external heater. The amount of carbon is that which maintains the reaction temperature within the desired temperature range and will vary, of course, with the scale of the equipment. In general, the amount of carbon utilized is in the range of from 0.05 moles carbon per mole of $FeCl_2$ up to 0.7 moles per mole of $FeCl_2$. A useful and preferred ratio is from about 0.1 to about 0.5 mole of carbon per mole of $FeCl_2$. Higher amounts of carbon can be used but there is no economic advantage in so doing.

Referring more particularly to FIG. 2, there is here shown in diagrammatic and schematic form a process flow sheet for one mode of utilizing the present invention. The numerical values associated with the compounds are in moles. Australian ilmenite ore is the iron-containing titaniferous ore used in the illustrated process. Typically, it has an analysis corresponding to the empirical formula $Fe_{0.56}TiO_{2.8}$. This Australian ore, which is obtained as a sand size material ($-40 +140$ mesh as mined) is divided into two parts. A 0.78 mole portion is introduced into a conventional fluidized bed reactor 30 from the top along with $-6 +40$ mesh, U. S. Standard petroleum coke (coal, preferably anthracite or brown coal may be used as well). A two mole portion of chlorine gas is introduced at the bottom of the reactor 30 and the rate adjusted for fluidization and complete nonselective chlorination of the metal values in the ore. The reaction temperature is 800-1100° C., e.g., 1000° C.

The vaporous reaction products are discharged through line 32 and contain 0.78 mole of $TiCl_4$ vapor, 0.44 mole of $FeCl_2$ vapor, and 1.1 moles of carbon oxides (as $CO_2$) from primary chlorinator 30.

The balance of the ore (0.22 mole portion) is ground to an average particle size of from 10 microns to 40 microns and along with powdered carbon of similar size is introduced into a downwardly directed entrained flow reactor 44 as a secondary reactor for chlorination with $FeCl_3$ vapor entering through line 42 from the preceding oxidation step. Advantageously, the added carbon here is a reactive (porous) carbon added in slight excess over stoichiometric. (See U.S. Pat. No. 4,329,322 for discussion of useful porous carbons, particularly these having a particle size less than 100 microns and a specific surface area of greater than 100 $m^2/g$.). This entrained flow (EFC) operation results in the production of a 0.22 mole portion of $TiCl_4$, a 1.24 mole portion of $FeCl_2$ vapor and carbon oxides. The gaseous efflux 46 from chlorinator 44 is combined with gaseous efflux 32 from chlorinator 30 at point 34 and quenched with a spray of liquid $TiCl_4$ 36 to a temperature of about 500-600° C. which causes the $FeCl_2$ to "snow out" of the gas stream. The solid $FeCl_2$ and carbon dust blow-over from chlorinator 30 plus excess carbon used in chlorinator 44 and gaseous phases, which contain one mole of newly formed $TiCl_4$ and 1.4 moles of carbon oxides as $CO_2$ are separated in a suitable cyclone separator 38.

The $FeCl_2$, 0.44 mole from primary chlorinator 30 and 1.24 mole from secondary chlorinator 44 is then introduced into an oxidizer 40 where it is partially oxidized ("partial" in that the oxygen is limited so that complete oxidation to $Cl_2$ is not accomplished). An apparatus suitable for use in partially oxidizing $FeCl_2$ to $FeCl_3$ and $Fe_2O_3$ is shown in FIG. 1. This partial oxidation yields a 0.28 mole portion of $Fe_2O_3$ and a 1.12 mole portion of $FeCl_3$. Molecular oxygen or air is introduced into the bottom of a suitable reactor 40, to effect the oxidation according to the equation:

$$12FeCl_2 + 3O_2 \rightarrow 8FeCl_3 + 2Fe_2O_3$$

In this oxidation step, only that amount of $O_2$ is used to yield $Fe_2O_3$ and $FeCl_3$ vapor plus that required to burn carbon to $CO_2$ and CO. This is in contrast to most prior art processes which attempt to force the oxidation to completion to yield $Cl_2$ and $Fe_2O_3$.

Thermodynamic calculations indicate that $FeCl_2$ oxidation is quite favorable in the 350-650° C. range; that is, the reaction goes essentially to completion in this range.

Thermodynamic calculations also indicate that the ferric chloride vapor produced by the oxidation reaction is mainly dimeric ($Fe_2Cl_6$) rather than monomeric ($FeCl_3$). At 600° C., 80 mole percent of the Fe(III) exists as dimer; at 400° C. it is about 98%. So the more correctly written oxidation equation should be:

$$12FeCl_{2(s)} + 3O_2 \rightarrow 4Fe_2Cl_{6(v)} + 2Fe_2O_3$$

with only a minor contribution from:

$$12FeCl_{2(s)} + 3O_2 \rightarrow 8FeCl_{3(v)} + 2Fe_2O_3.$$

Exemplary oxidation reactions were carried-out in a vertical quartz reactor tube 122 mm in length, 22.5 mm ID, with a gas inlet at the bottom and a gas outlet at the top. The reactor tube was held at 600° C. along 60 mm of its length by an electrical resistance heater. A bed of coarse silica sand was placed in the bottom of the reactor tube to support a bed of $FeCl_2$ powder in the 60 mm hot zone.

$FeCl_2$ powder (175 um av. dia.) was poured into the reactor tube, while flowing 1000 $cm^3$/min. of $N_2$ up through the tube, to give an $FeCl_2$ bed about 28 mm in height containing from 2.0 to 2.3 grams $FeCl_2$ per mm of height. The reactor was heated to 600° C. with the $N_2$ flow on. After reaching 600° C., the $N_2$ flow was stopped, a Teflon gas collection bag was attached to the top reactor gas outlet, and $O_2$ was admitted. After the amount of $O_2$ needed to react with 15 to 17 grams of $FeCl_2$ (equivalent to about 7.6 mm of bed height) was added, the $O_2$ flow was stopped and $N_2$ at the same flow rate as $O_2$ was started. The $N_2$ flow was stopped after a sufficient amount was added to purge unreacted $O_2$ and any $Cl_2$ into the gas collection bag.

The contents of the gas collection bag were analyzed for percent $N_2$, $O_2$, $Cl_2$, CO, and $CO_2$ by gas chromatography. From these results and the volume of $N_2$ metered to the Teflon bag, the volumes of $O_2$, $Cl_2$, CO, and $CO_2$ were calculated.

After calculating the actual amount of $FeCl_2$ reacted, this quantity of fresh $FeCl_2$ powder was added to the top of the $FeCl_2$ bed with $N_2$ flowing as before. Another 15 to 17 g $FeCl_2$ was reacted and the procedure was repeated.

As $Fe_2O_3$ built-up in the lower section of the $FeCl_2$ bed, the reactor tube was lowered through the heater to keep the bed of unreacted $FeCl_2$ in the heated zone. $Fe_2Cl_6$ vapor condensed in the cool section of the reactor tube between the heater and the gas collection bag. This was removed occasionally to prevent pluggage of the tube.

After 2 to 3 bed displacements (120 to 200 g $FeCl_2$) had been reacted (and added) the experiment was stopped. The results from each added portion of $FeCl_2$ was then averaged.

The average FeCl₂ bed height was 24 mm. The average superficial O₂ contact time was 4.8 seconds.

EXAMPLE 1

In this run, which is the best mode presently known to me for carrying out my invention is added to the charge of FeCl₂ and the reaction carried out at 600° C. One mole of carbon was mixed eight moles of FeCl₂. Results are given in Table I. The carbon used in this Example was a porous brown coal (lignite) char.

EXAMPLE 2

In this run, the conditions were the same as in Example 1 except that the carbon was calcined petroleum coke.

EXAMPLE 3

In this run, the conditions were the same as in Example 1 except that carbon was omitted.

Comparing the data in Table 1, it is see that the use of a reactive carbon in Example 1 results in complete carbon combustion, complete oxygen reaction, and in the lowest amount of $Cl_2$ contamination of the $Fe_2Cl_6$ product vapor.

In Example 2 it is seen that the use of a low reactivity carbon results in only partial carbon combustion, incomplete oxygen reaction, and in more $Cl_2$ contamination of the $Fe_2Cl_6$ product vapor.

In Example 3, where no carbon is present, the amount of unreacted oxygen is higher, and the $Cl_2$ contamination of the $Fe_2Cl_6$ product vapor stream is higher than when carbon is present.

The primary purpose for burning reactive carbon in the reaction zone is to provide the necessary energy (heat) to sustain the weakly exothermic reaction of oxygen with FeCl₂. However, I found these unexpected beneficial results:

(a) complete utilization of oxygen;
(b) efficient utilization of carbonaceous fuel;
(c) suppression of the undesirable reaction of oxygen with FeCl₃ which produces undesirable chlorine (Cl₂).

It is unclear why the presence of carbon suppresses the undesired reaction of O₂ with Fe₂Cl₆ to produce Cl₂. Although not wanting to be bound by this theory, it is possible that carbon adsorbs Cl₂ from the gas phase to form unstable (reactive) C-Cl surface sites. The chlorine values in these surface sites are restrained in the reaction zone (unlike Cl₂ gas that flows from the reaction zone along with Fe₂Cl₆1 vapor) where they slowly react with FeCl₂ to form Fe₂Cl₆ product.

While this process has been described in conjunction with a dual stage process for making TiCl₄, it will be understood that the process may be used independently, if desired, to make FeCl₃ from FeCl₂, or to make finely divided Fe₂O₃.

TABLE 1

| | Example 1 | Example 2 | Example 3 |
|---|---|---|---|
| Moles Carbon/Mole FeCl₂ | 0.125 | 0.125 | 0.00 |
| Type of Carbon | Lignite Char | Calcined Petroleum Coke | None |
| Carbon Sieve Size | 100% −200 Mesh | 100% −200 Mesh | — |
| Carbon Surface Area, m2/g | 370 | 1 | — |
| % Carbon Not Reacting | 0. | 35. | — |
| % O₂ Not Reacting | 0.0 | 0.4 | 0.5 |
| Mole % Cl₂ in Fe₂Cl₆ | 0.3 | 0.5 | 3.7 |

TABLE 1-continued

| | Example 1 | Example 2 | Example 3 |
|---|---|---|---|
| Product Vapor | | | |

What is claimed is:

1. A continuous process for the partial oxidation of solid ferrous chloride (FeCl₂) to ferric chloride (FeCl₃ and/or Fe₂Cl₆) and ferric oxide (Fe₂O₃) in a reactor, which comprises:
   (a) establishing and maintaining a reaction zone having a solid inlet end and a solid outlet end at a. temperature of from bout 350° C. to about 675° C.;
   (b) feeding solid FeCl₂ and reactive carbon into the solid inlet end of the zone, the reactive carbon being porous and having a specific surface area of at least 100 m²g;
   (c) feeding a molecular oxygen-containing gas into the solid outlet end of the zone under conditions so that the molecular oxygen flows toward the inlet end of the zone and contacts and reacts with the FeCl₂ and the reactive carbon to produce Fe₂O₃ solid, FeCl₃ or Fe₂Cl₆ vapor and gaseous carbon oxides;
   (d) removing the Fe₂O₃, FeCl₃ or Fe₂Cl₆ and carbon oxides so produced from the reaction zone;
   (e) controlling the fee rates of the FeCl₂, reactive carbon, and molecular oxygen-containing gas and the removal rates of the Fe₂O₃, FeCl₃ or Fe₂Cl₆ and the carbon oxides so as to obtain a concentration gradient from the solid inlet end to the solid outlet end of the zone wherein at the solid inlet end the concentrations of FeCl₂ and FeCl₃ or Fe₂Cl₆ are the highest and the concentration of oxygen is the lowest and at the solid outlet end the concentration of oxygen is the highest and the concentration of FeCl₂ and FeCl₃ or Fe₂Cl₆ are the lowest and so that the ferric chloride being removed from the reactor contains less than 0.3 mole % chlorine based upon the amount of Fe₂Cl.

2. A process of claim 1, wherein the reactive carbon is added in an amount sufficient to provide enough heat to maintain the temperature of the reaction zone in the range from about 350° C. to about 650° C.

3. A process of claim 2, wherein the reactive carbon and FeCl₂ are fed into the reaction zone at a molar ratio of from about 0.05 to about 0.7 reactive carbon to FeCl₂.

4. A process of claim 3, wherein the reactive carbon and FeCl₂ are fed into the reaction zone at a molar ratio of from about 0.1 to about 0.5.

5. A process of claim 1, wherein the temperature of the reaction zone is maintained at a temperature of from about 525° C. to about 600° C.

6. A process for the continuous partial oxidation of ferrous chloride (FeCl₂) to ferric chloride (FeCl₃ or Fe₂Cl₆) and ferric oxide (Fe₂O₃) which comprises:
   (a) heating a bed comprising solid FeCl₂ particles and porous reactive carbon having a specific surface area of at least 100 m²/g to a temperature in the range of from about 350° C. to about 675° C;
   (b) flowing a molecular oxygen-containing gas upwardly through the bed under conditions so that the oxygen reacts with the solid FeCl₂ particles and the reactive carbon to form Fe₂O₃ solid, FeCl₃ or Fe₂Cl₆ vapor, and gaseous carbon oxides;

(c) removing the resulting $Fe_2O_3$ solids from the bottom of the bed and the resulting $FECl_3$ or $Fe_2Cl_6$ vapor and the carbon oxides from the top of the bed, the $FeCl_3$ or $Fe_2Cl_6$ vapor being removed from the bed containing less than 0.3 mole % chlorine based upon the amount of $FeCl_2$;

(d) adding fresh $FeCl_2$ and reactive carbon to the top of the bed;

controlling the removal of $Fe_2O_3$ and the addition of fresh $FeCl_2$ and the reactive carbon so as to establish and maintain three partially overlapping zones of solids consisting of (i) an upper zone composed mainly of fresh $FeCl_2$ and reactive carbon, (ii) an intermediate zone composed mainly of $FeCl_2$, $Fe_2O_3$ and reactive carbon, and (iii) a lower zone composed mainly of $Fe_2O_3$.

7. A process of claim 6, wherein the bed is heated to a temperature of from about 525° C. to 600° C.

8. A process of claim 6, wherein the reactive carbon is added in an amount sufficient to maintain the bed at a temperature in the range of 350° C. to 675° C.

9. A process of claim 8, wherein the reactive carbon and $FeCl_2$ are added at a molar ratio of 0.05 to 0.7.

10. A process of claim 9, wherein the molar ratio is 0.1 to 0.5.

* * * * *